United States Patent
Takeuchi

(10) Patent No.: US 8,199,352 B2
(45) Date of Patent: Jun. 12, 2012

(54) IMAGE FORMING APPARATUS AND CONTROL METHOD THEREFOR

(75) Inventor: Tomoyuki Takeuchi, Kawasaki (JP)

(73) Assignee: Canon Kabushiki Kaisha (JP)

( * ) Notice: Subject to any disclaimer, the term of this patent is extended or adjusted under 35 U.S.C. 154(b) by 701 days.

(21) Appl. No.: 12/418,984

(22) Filed: Apr. 6, 2009

(65) Prior Publication Data

US 2009/0257086 A1 Oct. 15, 2009

(30) Foreign Application Priority Data

Apr. 9, 2008 (JP) ................................. 2008-101401

(51) Int. Cl.
*G06F 15/00* (2006.01)
*G06F 3/12* (2006.01)
*G06K 1/00* (2006.01)
(52) U.S. Cl. ...................................... 358/1.15; 358/1.13
(58) Field of Classification Search ........................ None
See application file for complete search history.

(56) References Cited

U.S. PATENT DOCUMENTS 5,974,232 A * 10/1999 Kamiya ........................ 709/238
7,965,403 B2 * 6/2011 Murakami .................... 358/1.15

FOREIGN PATENT DOCUMENTS

JP 2007-30252 A 2/2007

* cited by examiner

*Primary Examiner* — Douglas Tran
(74) *Attorney, Agent, or Firm* — Rossi, Kimms & McDowell LLP

(57) ABSTRACT

An image forming apparatus that permits alteration of print data during execution of a print job for the print data stored in an external apparatus. Upon generation of an interruption job during execution of the print job for the print data, an MFP suspends the print job. If free space in a memory is less than the capacity required for execution of the interruption job, the MFP erases the print data in the memory and carries out the interruption job. When the interruption job is completed, the MFP transmits to another MFP a request for transmission of copy data of the print data and restarts the print job for the copy data of the print data transmitted from the other MFP in response to the transmission request.

13 Claims, 13 Drawing Sheets

IMAGE FORMING APPARATUS AND CONTROL METHOD THEREFOR

BACKGROUND OF THE INVENTION

1. Field of the Invention

The present invention relates to an image forming apparatus capable of drawing, from an external apparatus, print data stored therein and executing a print job for the print data, and relates to a control method for the image forming apparatus.

2. Description of the Related Art

Some of multi-function peripherals having multiple functions, such as a printer function and a scanner function, has a hard disk unit (HD) for storage of print data. Print data stored in the HD of such a multi-function peripheral (hereinafter referred to as the first MFP) can be printed by a second MFP having a memory for temporary storage of print data. This type of printing is called pull print. To perform the pull print, the second MFP draws print data from the first MFP and temporarily stores the print data until completion of printing the print data. Thus, it is not essentially required for the second MFP to have an HD.

During the execution by the second MFP of a print job for the print data drawn from the first MFP, another job is sometimes generated. If the other job (hereinafter referred to as the interruption job) has higher priority than the currently executed print job, the currently executed print job is interrupted. At that time, if free space in the memory is less than the memory capacity required for execution of the interruption job, the print data in the memory is erased to ensure the required memory capacity. Upon completion of the interruption job, the second MFP draws again from the first MFP the print data for the interrupted print job and restarts the interrupted print job.

However, the print data is sometimes altered in the first MFP by another user before the print data is drawn therefrom again by the second MFP. In that case, the second MFP cannot acquire the print data before being altered and cannot correctly restart the interrupted print job.

To eliminate this problem, the following two methods are known.

The first method is to prohibit the print data (original) from being altered during execution by the second MFP of a print job for the print data drawn from the first MFP. With this method, it is ensured that the print data drawn again is the same as the initially drawn print data, whereby the same print job can be restarted.

The second method is to save print data stored in the memory of the second MFP to another location on a LAN when an interruption job is generated (Japanese Laid-open Patent Publication No. 2007-30252). With this method, the saved print data can be drawn after completion of the interruption job and the same print job as the interrupted print job can be restarted.

However, according to the first method, print data cannot be altered by the first MFP during execution of the print job for the print data drawn from the first MFP, which is inconvenient for users.

With the second method, since print data is saved from the second MFP to another location via a network such as LAN, it takes much time to save the print data and unnecessary load is applied to the network.

SUMMARY OF THE INVENTION

The present invention provides an image forming apparatus capable of permitting alteration of print data during execution of a print job for the print data stored in an external apparatus and reducing to a minimum the number of times of saving the print data upon generation of an interruption job to thereby reduce unnecessary load on a network, and provides a control method for the image forming apparatus.

According to a first aspect of this invention, there is provided an image forming apparatus having an image processing unit that performs image processing based on image data acquired from another image forming apparatus, comprising a first request unit adapted to request that the other image forming apparatus transmits image data stored in the other image forming apparatus and holds copy data copied from the image data, a reception unit adapted to receive the image data transmitted from the other image forming apparatus, a storage unit adapted to store the image data received by the reception unit, a determination unit adapted to determine whether or not a job having priority higher than the image processing is generated during execution of the image processing by the image processing unit based on the image data stored in the storage unit, an erase unit adapted to erase the image data stored in the storage unit in a case that it is determined by the determination unit that the job is generated, and a second request unit adapted to request the other image forming apparatus to transmit the copy data after the job is processed, wherein the image processing unit restarts the image processing based on the copy data transmitted from the other image forming apparatus in response to the request by the second request unit.

According to a second aspect of this invention, there is provided an image forming apparatus comprising a first storage unit adapted to store image data into a storage device, a reception unit adapted to receive from another image forming apparatus a request for transmission of the image data stored in the storage device by the first storage unit, a transmission unit adapted to transmit the image data stored in the storage device by the first storage unit to the other image forming apparatus in response to the request received by the reception unit, a second storage unit adapted, in response to the request received by the reception unit, to generate copy data copied from the image data stored in the storage device by the first storage unit and store the copy data into the storage device or another storage device, a second transmission unit adapted to transmit copy data stored in the storage device or the other storage device by the second storage unit to the other image forming apparatus in response to a request from the other image forming apparatus, and an erase unit adapted to erase the copy data stored in the storage device or the other storage device by the second storage unit in response to an instruction from the other image forming apparatus.

According to a third aspect of this invention, there is provided an image forming apparatus having an image processing unit that performs image processing based on image data acquired from another image forming apparatus, comprising a request unit adapted to request the other image forming apparatus to transmit image data stored in the other image forming apparatus, a reception unit adapted to receive the image data transmitted from the other image forming apparatus, a first storage unit adapted to store the image data received by the reception unit, a determination unit adapted to determine whether or not a job having priority higher than the image processing is generated during execution of the image processing by the image processing unit based on the image data stored in the first storage unit, a second storage unit adapted to store the image data stored in the first storage unit into another storage device in a case that it is determined by the determination unit that the job is generated and image data stored in the other image forming apparatus is altered, an erase unit adapted to erase image data stored in the first storage unit, and an acquisition unit adapted to acquire the image data stored in the other storage device by the second storage unit from the other storage device after the job is processed, wherein the image processing unit restarts the image processing based on the image data acquired by the acquisition unit.

According to fourth to sixth aspects, there are provided control methods for the image forming apparatuses according to the first to third aspect of this invention.

With this invention, it is possible to permit alteration of print data during execution of a print job for print data stored in an external apparatus and reduce to a minimum the number of times of saving the print data upon occurrence of an interruption job to thereby reduce unnecessary load on a network.

Further features of the present invention will become apparent from the following description of exemplary embodiments with reference to the attached drawings.

DETAILED DESCRIPTION OF THE PREFERRED EMBODIMENTS

The present invention will now be described in detail below with reference to the drawings showing preferred embodiments thereof.

First Embodiment

Figure 1:
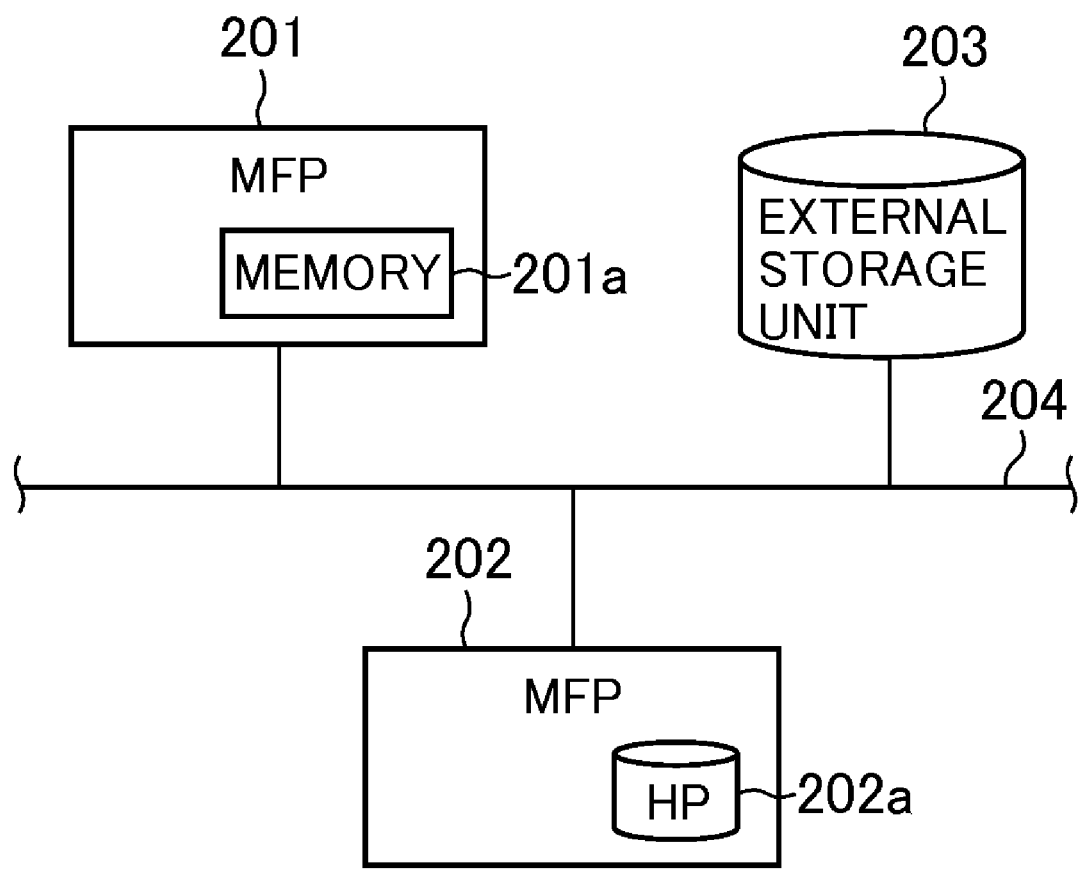
FIG. 1 is a block diagram showing the construction of a system including an image forming apparatus according to a first embodiment of this invention.

FIG. 1 shows in block diagram the construction of a system including an image forming apparatus according to a first embodiment of this invention.

As shown in FIG. 1, the system includes a plurality of, e.g., two multi-function peripherals (hereinafter referred to as the MFPs) 201, 202 and an external storage unit 203. The MFPs 201, 202 and the storage unit 203 are connected to a network, e.g., a LAN (local area network) 204 to which servers, client computers, etc. (none of which are shown) are connected. Each of the MFPs in this embodiment is an example image forming apparatus. The image forming apparatus is not limited to the MFP, but may be a printer, a scanner, a facsimile machine, a copying machine, a personal computer, a cellar phone, or the like.

Each of the MFPs 201, 202 has multiple functions, such as functions of facsimile, data transfer, scanner, printer and copier and is able to perform various jobs using these functions. The MFP 201 has a memory 201a of small capacity for temporary storage of to-be-processed data such as image data and document data, but does not have an HD having a capacity sufficiently larger than that of the memory 201a. On the other hand, the MFP 202 has an HD 202a having a sufficiently larger capacity than the memory 201a. In other respects, the MFPs 201, 202 are basically the same in construction as each other.

The external storage unit 203 includes an HD of large capacity in which data transferred via the LAN 204, etc. are stored.

Figure 2:
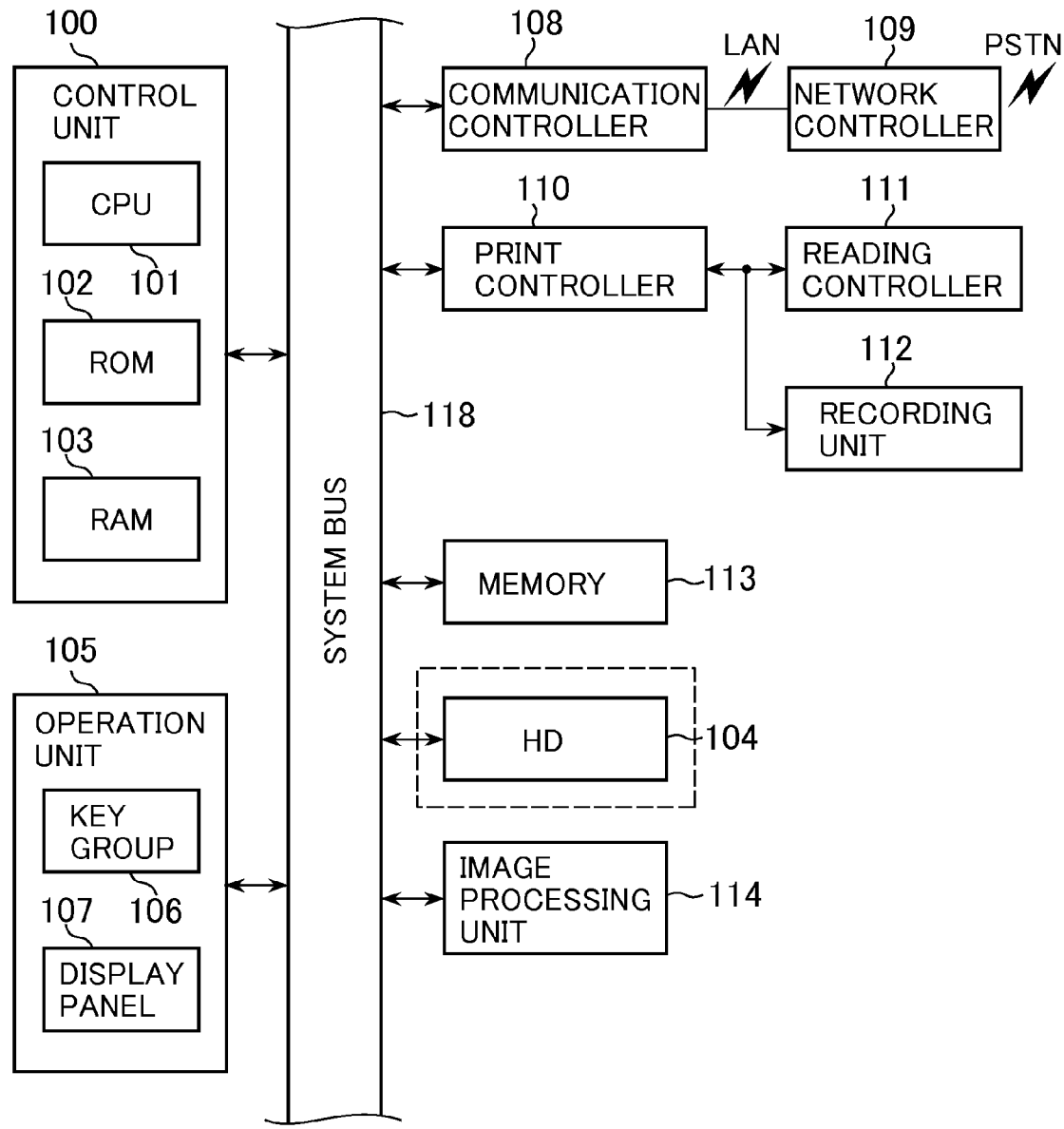
FIG. 2 is a block diagram showing the construction of MFPs in FIG. 1.

Next, the construction of the MFPs 201, 202 is described with reference to FIG. 2. FIG. 2 shows in block diagram the construction of the MFPs 201, 202.

As shown in FIG. 2, each of the MFPs 201, 202 includes a control unit 100 for controlling the MFP. The control unit 100 includes a CPU 101, a ROM 102, and a RAM 103. In accordance with a control program stored in the ROM 102 and by using the RAM 103 as a work area, the CPU 101 carries out the overall control of the MFP and controls various units of the MFP which are connected to a system bus 118. An operation unit 105, a communication controller 108, a print controller 110, a memory 113 (an HD 104), an image processing unit 114, etc. are connected to the system bus 118.

The operation unit 105 includes a key group 106 including hardware keys (ten keys, a start key, etc.) operable by a user for input operations such as inputting of settings and instructions, and includes a display panel 107 comprised of, for example, a liquid crystal display with touch panel. The display panel 107 displays various information such as setting information, apparatus state, input information, and also displays software keys for input operations.

The communication controller 108 transmits and receives data such as image data and document data and control commands to and from apparatuses on the LAN 204. A network controller 109 connected to the communication controller 108 is adapted for connection with a PSTN (public switched telephone network) and performs predetermined line control for line connection and line disconnection upon transmission and reception of data, etc. The network controller 109 incorporates a modem that modulates and demodulates image data and control signals to thereby transmit and receive facsimile data via the PSTN.

The print controller 110 is an interface for controlling a reading unit 111 and a recording unit 112. The reading unit 111 reads an original and transmits image data of the original to the print controller 110. The recording unit 112 is a printer for printing data input from the print controller 110 based on a predetermined method such as electrophotographic method, ink jet method, thermal head method, and dot impact method. As the image data input from the print controller 110 to the recording unit 112, there may be mentioned image data transmitted from the reading unit 111, or image data or document data received from apparatuses on the LAN 204 such as, for example, the MFPs 201, 202.

The memory 113 is comprised of a semiconductor memory such as a RAM, and temporarily stores image data transmitted from the reading unit 111, data received from apparatuses on the LAN 204, etc. The memory 113 corresponds to the memory 201a in the MFP 201 (FIG. 1).

As with the memory 113, the HD 104 stores image data transmitted from the reading unit 111, image data (or print data) received from apparatuses on the LAN 204, etc. The HD 104 has its storage capacity sufficiently larger than that of the memory 113. The HD 104 corresponds to the HD 202a of the MFP 202 (FIG. 1), and is not mounted on the MFP 201. The memory 113 and the HD 104 are exemplar storage devices.

The image processing unit 114 performs various image processing such as compression and decompression on image data.

In this embodiment, pull print can be carried out in which the MFP 201 draws, from the HD 202a of the MFP 202, print data (such as image data) stored therein and prints the same. The outline of the pull print is described below with reference to FIGS. 3A to 3D. FIGS. 3A to 3D schematically show how requests and print data to be pull printed are exchanged between the MFPs 201, 202 and the external storage unit 203 and how print data and copy data thereof are stored in the MFPs 201, 202.

Figure 3A:
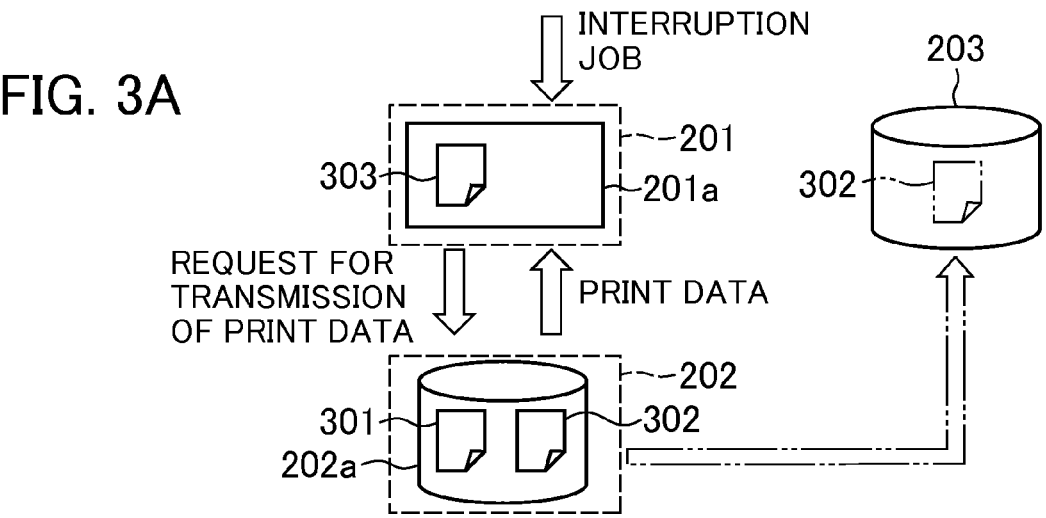
FIGS. 3A to 3D are views schematically showing how requests and print data to be pull printed are exchanged between the MFPs and an external storage unit in FIG. 1 and how print data and its copy data are stored in the MFPs.

As shown in FIG. 3A, print data 301 is stored in the HD 202a of the MFP 202. In order for the MFP 201 to print (pull print) the print data 301 stored in the HD 202a of the MFP 202, the MFP 201 transmits via the LAN 204 (FIG. 1) to the MFP 202 a request for transmission of the print data to be pull printed. The transmission request is to request transmission of the print data 301 to be pull printed, copying of the print data 301, and holding of the resultant copy data (first and second request units). When receiving the transmission request, the MFP 202 copies the print data 301 (original) and stores the resultant copy data (print data 302) into the HD 202a or the external storage unit 203. Whether the copy data is to be stored into the HD 202a or the external storage unit 203 is selected according to free space on the HD 202a. The MFP 202 transmits the print data 301 (or the print data 302 which is copy data of the print data 301) to the MFP 201 via the LAN 204 (transmission unit).

The MFP 201 receives the print data 302 transmitted from the MFP 202 and stores the print data 302 as print data 303 into the memory 201a. Then, the MFP 201 starts a print job for the print data 303 (i.e., a print job for the print data 301).

During execution of the print job for the print data 303, when an interruption job having higher priority than the print job is generated, the MFP 201 interrupts the print job for the print data 303, and determines whether free space in the memory 201a is less than the capacity required for execution of the interruption job. In a case that the size of the interruption job can be found in advance, the job size is compared with the free space in the memory 201a, and the free space determination is performed based on a result of the comparison. As the interruption job whose size can be found in advance, there may be mentioned a job having a header in which the job size is indicated, such as a print job of PDL format. In a case that the interruption job is a scan job or other job whose size cannot be found in advance, data for the interruption job is stored from its head into the memory 201a. Then, the free space determination is performed based on whether the last data for the interruption job has been stored into the memory 201a or the memory 201a has become full before the last data is stored into the memory 201a.

Figure 3B:
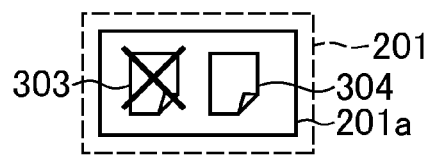

In a case that the free space in the memory 201a is less than the capacity required for execution of the interruption job, the MFP 201 erases the print data 303 in the memory 201a as shown in FIG. 3B to ensure the capacity required for the execution of the interruption job. Then, the MFP 201 executes the interruption job 304 using the memory 201a, such as storing data 304 for the interruption job into the memory 201a.

Figure 3C:
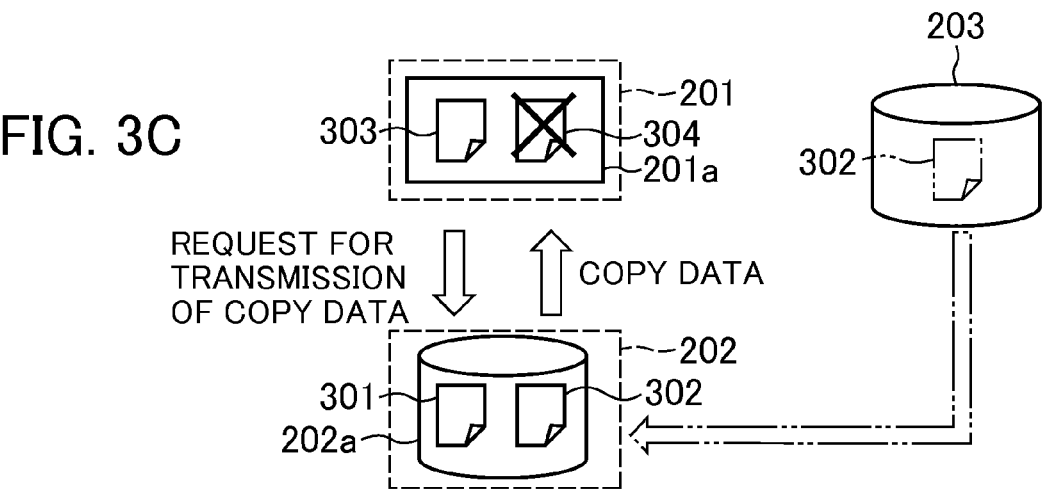

When the interruption job 304 is completed, the MFP 201 erases the data 304 for the interruption job in the memory 201a as shown in FIG. 3C. Then, the MFP 201 transmits to the MFP 202 a request for transmission of the copy data of the print data 301, i.e., the print data 302 (second and third request units). When receiving the transmission request, the MFP 202 transmits, via the LAN 204 to the MFP 201, the print data 302 stored in the HD 202a or the external storage unit 203 (second transmission unit). When receiving the print data 302, the MFP 201 stores the print data 302 as print data 303 into the memory 201a, and restarts the print job.

Figure 3D:
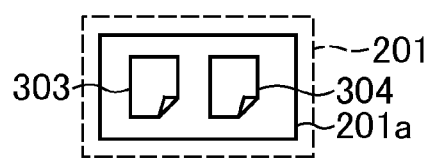

On the other hand, if the free space in the memory 201a is equal to or larger than the capacity required for execution of the interruption job, the MFP 201 does not erase the print data 303 in the memory 201a as shown in FIG. 3D. Then, the MFP 201 stores data 304 for the interruption job into the memory 201a together with the print data 303, and executes the interruption job. When the interruption job 304 is completed, the interruption job data 304 in the memory 201a is erased, and the print job for the print data 303 stored in the memory 201a is restarted.

Figure 4:
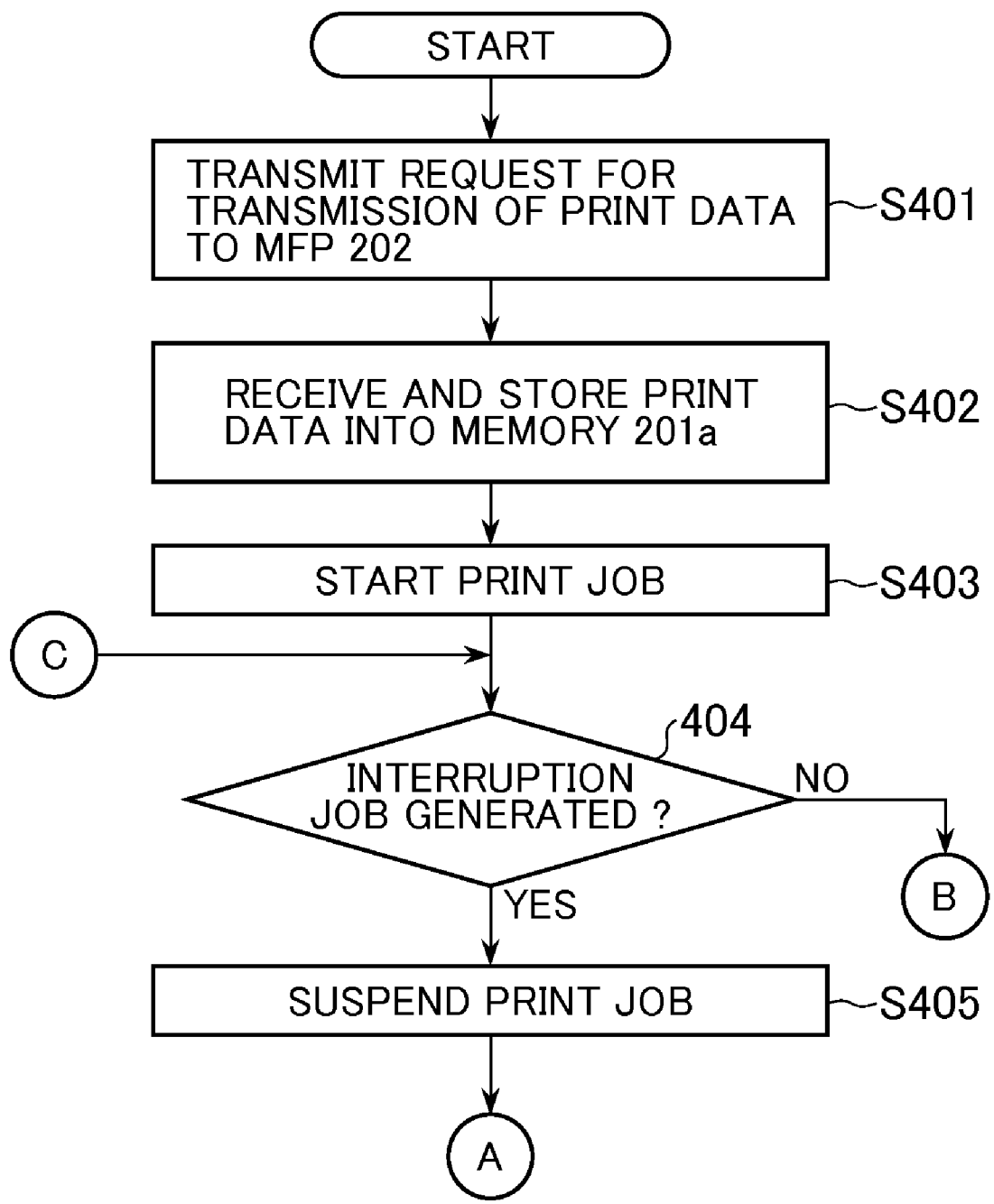
FIG. 4 is a part of a flowchart showing the procedures of a process for pull print performed by one of the MFPs in FIG. 1.
Figure 5:
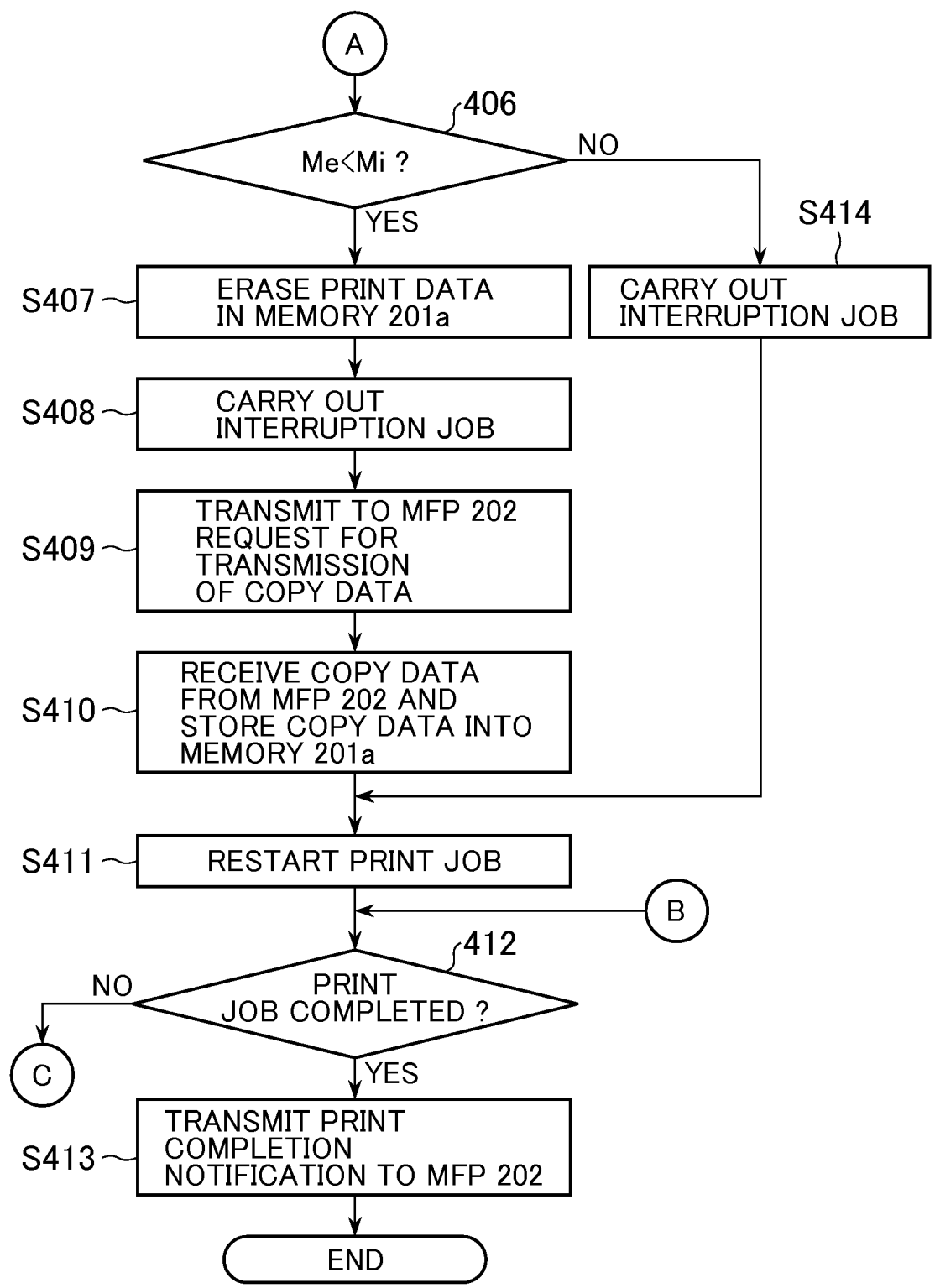
FIG. 5 is the remaining part of the flowchart following the part in FIG. 4.

In the following, a process for pull print performed by the MFP 201 is described with reference to FIGS. 4 and 5, which show in flowchart the procedures of the process for pull print by the MFP 201. The procedures shown in FIGS. 4 and 5 are executed by the CPU 101 (control unit 100) of the MFP 201 in accordance with a program stored in the ROM 102. The following is a description of an exemplar case where the MFP 201 draws the print data 301 stored in the HD 202a of the MFP 202 and prints (pull prints) the print data 301.

As shown in FIG. 4, to carry out the pull print, the MFP 201 (CPU 101) transmits, via the LAN 204 to the MFP 202 in which the print data 301 is stored, a request for transmission of the print data 301 to be pull printed (step S401). The MFP 201 receives the print data 301 (or print data 302 which is copy data of the print data 301) transmitted from the MFP 202 in response to the transmission request, and stores the print data 301 as print data 303 into the memory 201a (step S402).

Next, the MFP 201 starts a print job for the print data 303 (step S403). During execution of the print job for the print data 303, the MFP 201 determines whether or not an interruption job having higher priority than the print job 303 is generated (step S404). When the interruption job is generated, the MFP 201 suspends the printing of the print data 303 (step S405).

Next, as shown in FIG. 5, the MFP 201 determines whether or not the free space Me in the memory 201a is less than the capacity Mi required for execution of the interruption job (whether a relation of Me<Mi is fulfilled) (step S406). If the relation of Me<Mi is fulfilled, the MFP 201 erases the print data 303 in the memory 201a (step S407). Then, the MFP 201 carries out the interruption job using the memory 201a (step S408). When the interruption job is completed, the interruption job data in the memory 201a is erased.

Next, the MFP 201 transmits, via the LAN 204 to the MFP 202, a request for transmission of copy data of the print data 301, i.e., print data 302 (step S409). Subsequently, the MFP 201 receives the print data 302 (copy data of print data 301)

transmitted from the MFP 202 in response to the transmission request, and stores the print data 302 as print data 303 into the memory 201*a* (step S410).

Next, the MFP 201 restarts the print job for the print data 303 stored in the memory 201*a*, as the print job for the print data 301 (step S411). Then, the MFP 201 determines whether or not the print job for the print data 303 (i.e., print job for print data 301) is completed (step S412). If the print job for the print data 303 is not completed, the MFP 201 returns to step S404 and determines whether or not an interruption job is generated during execution of the print job for the print data 303. On the other hand, if the print job for the print data 303 is completed, the MFP 201 transmits, via the LAN 204 to the MFP 202, a print completion notification representing completion of the print job for the print data 303 (step S413). The print completion notification also requests the MFP 202 to erase the print data 302, which is copy data of the print data 301 stored in the HD 202*a*. Thereafter, the MFP 201 completes the present process.

If it is determined in step S406 that the relation of Me<Mi is not fulfilled, the MFP 201 carries out the interruption job using the memory 201*a* (step S414). In that case, the print data 303 in the memory 201*a* is not erased, and both the print data 303 and data for the interruption job are stored in the memory 201*a*. When the interruption job is completed, the data for the interruption job in the memory 201*a* is erased.

Next, the MFP 201 restarts the print job for the print data 303 stored in the memory 201*a*, as the print job for the print data 301 (step S411). Then, the MFP 201 determines whether or not the print job for the print data 303 is completed (step S412). If the print job for the print data 303 is not completed, the MFP 201 returns to step S404. On the other hand, if the print job for the print data 303 is completed, the MFP 201 transmits a print completion notification to the MFP 202 via the LAN 204 (step S413), and completes the present process.

If it is determined in step S404 that no interruption job is generated, the MFP 201 proceeds to step S412 and determines whether or not the print job for the print data 303 is completed.

Until completion of the print job restarted at step S411, printing is performed in step S412 for the remaining part of the print job. In step S409, the MFP 201 may only request print data for the remaining pages for which printing has not been made. In that case, the MFP 201 may transmit to the MFP 202 a request that includes information specifying the number of pages for which the printing process has been completed or specifying pages to be acquired, whereby unnecessary load on the LAN 204 can be reduced.

Figure 6:
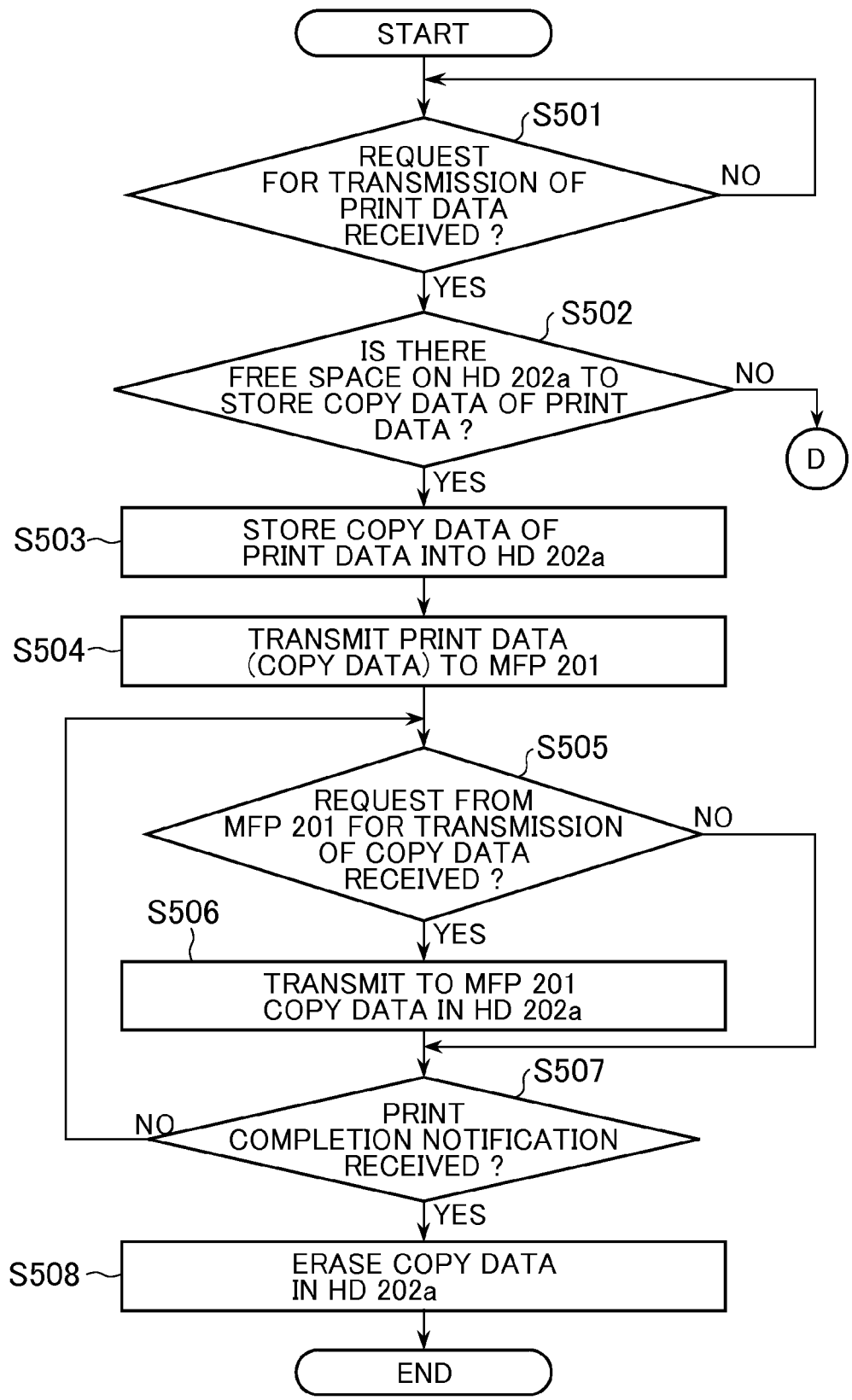
FIG. 6 is a part of a flowchart showing a process performed by another MFP in FIG. 1 when it receives a request for transmission of print data to be pull printed.
Figure 7:
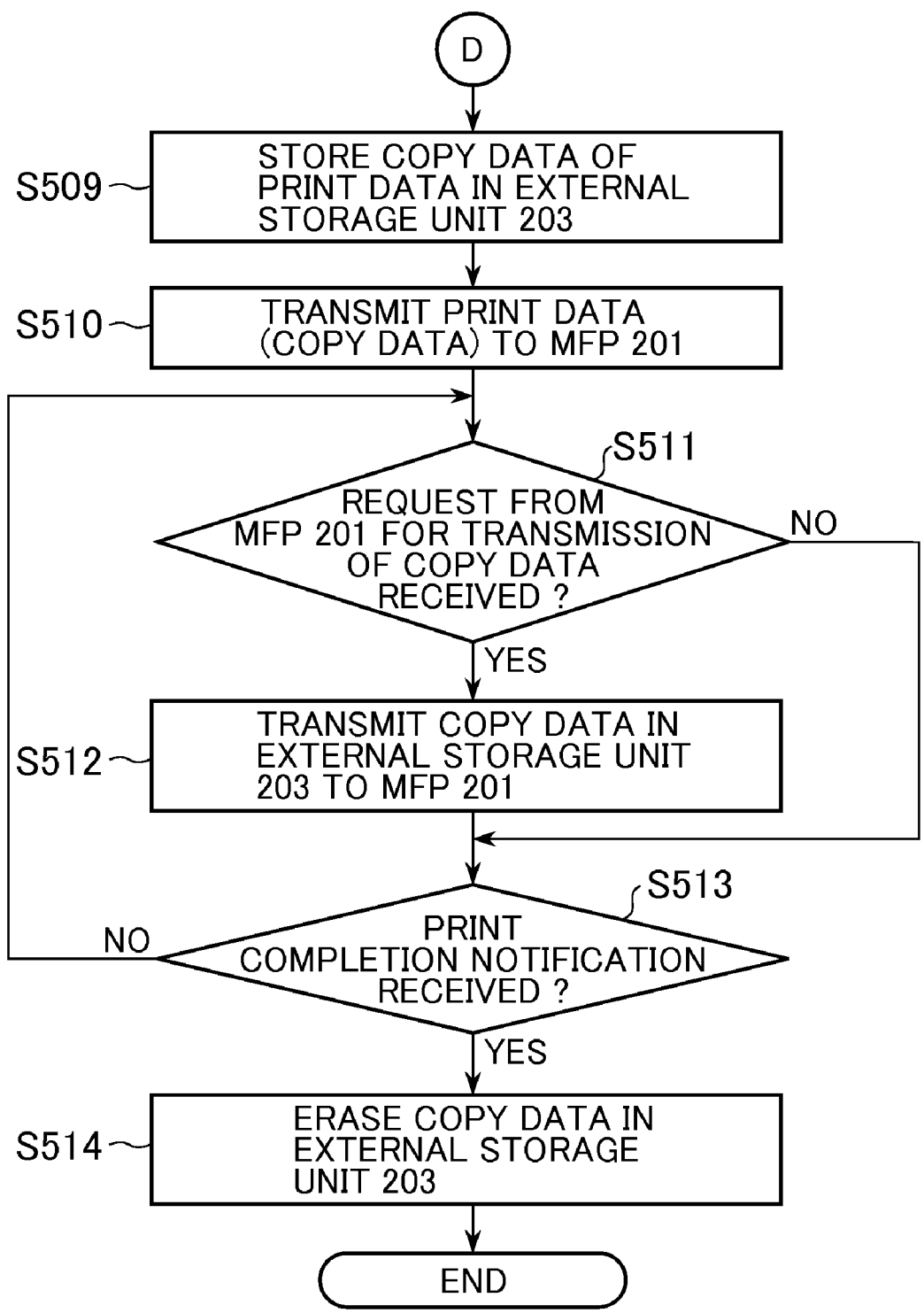
FIG. 7 is the remaining part of the flowchart following the part in FIG. 6.
Figure 8:
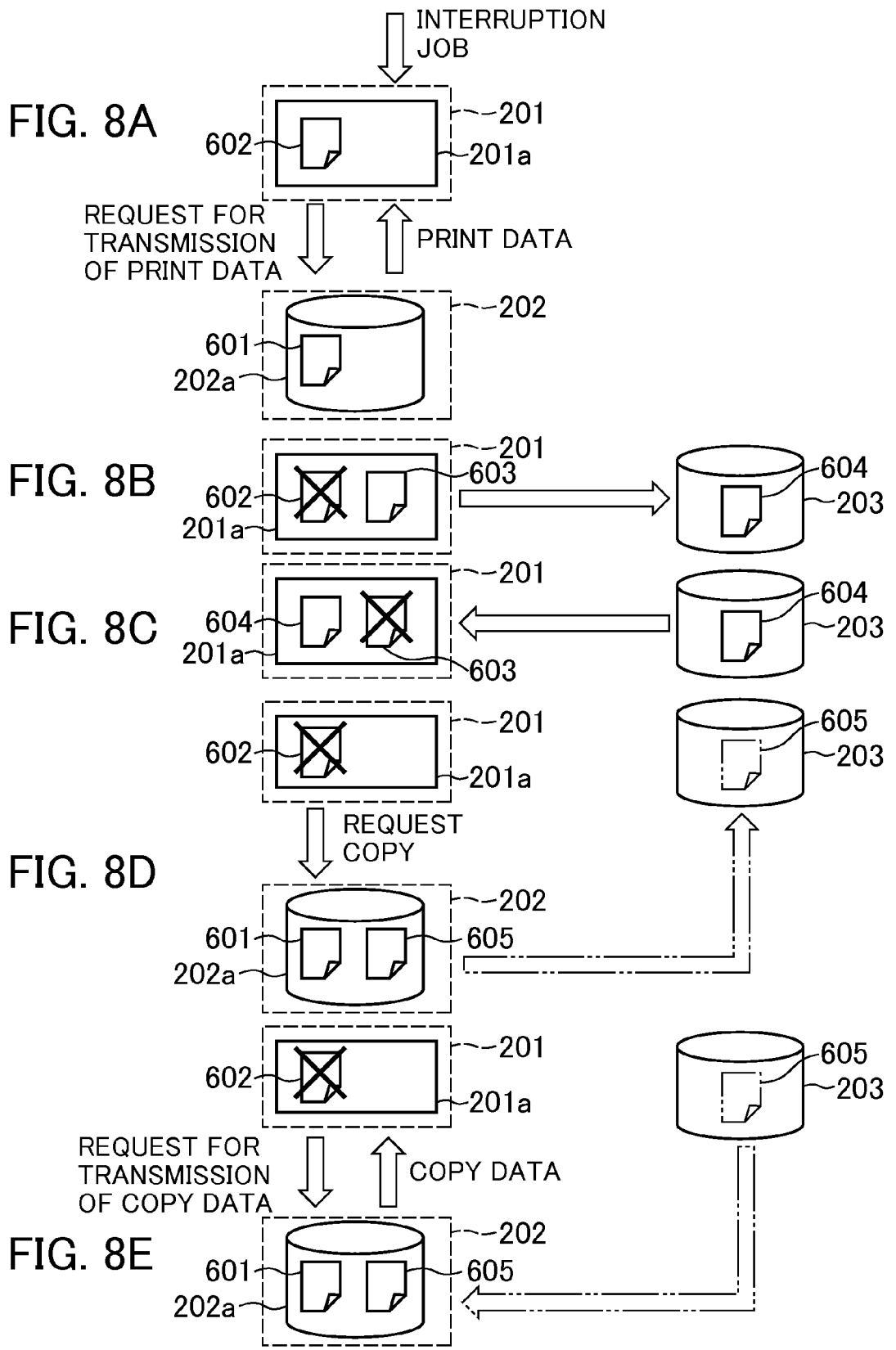
FIGS. 8A to 8E are views schematically showing how requests and print data are exchanged between MFPs and an external storage unit and how print data and its copy data are stored in the MFPs in a second embodiment of this invention.

In the following, with reference to FIGS. 6 and 7, a description will be given of a process performed by the MFP 202 upon reception from the MFP 201 of a request for transmission of print data 301 to be pull printed. FIGS. 6 and 7 show in flowchart the procedures of the process performed by the MFP 202 receiving the request for transmission of print data to be pull printed. The procedures shown in FIGS. 6 and 7 are executed by the CPU 101 (control unit 100) of the MFP 202 in accordance with a program stored in the ROM 102.

As shown in FIG. 6, the MFP 202 (CPU 101) determines whether or not it receives a request for transmission of print data 301 from the MFP 201 via the LAN 204 (step S501). When receiving the transmission request, the MFP 202 determines whether or not the HD 202*a* has free space large enough to store copy data of the print data 301 (step S502). If the HD 202*a* has free space required to store the copy data of the print data 301, the MFP 202 copies the print data 301 and stores the resultant copy data (print data 302) into the HD 202*a* (step S503). Then, the MFP 202 transmits the print data 301 or the print data 302 which is copy data of the print data 301 to the MFP 201 via the LAN 204 (step S504).

Then, the MFP 202 determines whether or not it receives a request for transmission of copy data of print data 301 from the MFP 201 via the LAN 204 (step S505). When receiving the request for transmission, the MFP 202 transmits, via the LAN 204 to the MFP 201, the print data 302 (copy data of print data 301) stored in the HD 202*a* (step S506).

Next, the MFP 202 determines whether or not it receives a print completion notification from the MFP 201 via the LAN 204 (step S507). When receiving the print completion notification, the MFP 202 erases the print data 302 in the HD 202*a* (step S508), and completes the present process. On the other hand, if the MFP 202 does not receive the print completion notification, the MFP 202 returns to step S505.

If it is determined in step S505 that the transmission request is not received, the MFP 202 skips step S506 and proceeds to step S507.

If it is determined in step S502 that the HD 202a has not free space required to store the copy data of the print data 301, the MFP 202 proceeds to step 509 in FIG. 7. In step S509, the print data 301 is copied, and the resultant copy data (print data 302) is transmitted via the LAN 204 to and stored into the external storage unit 203. Then, the MFP 202 transmits via the LAN 204 to the MFP 201 the print data 301 (or print data 302 which is copy data of the print data 301) (step S510).

Next, the MFP 202 determines whether or not it receives a request for transmission of the copy data of the print data 301 from the MFP 201 via the LAN 204 (step S511). When receiving the transmission request, the MFP 202 transmits the print data 302 (copy data of print data 301) stored in the external storage unit 203 to the MFP 201 via the LAN 204 (step S512).

Next, the MFP 202 determines whether or not it receives a print completion notification on the print data 301 from the MFP 201 via the LAN 204 (step S513). When receiving the print completion notification, the MFP 202 erases the print data 302 stored in the external storage unit 203 (step S514), and completes the present process. On the other hand, if the MFP 202 does not receive the print completion notification, the MFP 202 returns to step S511.

If it is determined in step S511 that the transmission request is not received, the MFP 202 skips step S512 and proceeds to step S513.

As described above, when the print data 301 stored in the HD 202*a* of the MFP 202 is drawn therefrom and printed by the MFP 201, copy data of the print data 301 is stored into the HD 202*a* of the MFP 202 or the external storage unit 203. Upon restart of the print job for the print data 301, therefore, the copy data of the print data 301, i.e., the print data which is the same as the print data 301 before being suspended, can be drawn from the MFP 202. As a result, the print job can be correctly restarted, while permitting a user to alter the print data 301 (original) in the MFP 202.

Since the copy data of the print data 301 before being altered is stored by the MFP 202 into the HD 202*a* of the MFP 202 or the external storage unit 203, it is unnecessary for the MFP 201 to save from the memory 201*a* of the MFP 201 the print data 301 before being altered. Since the MFP 202 has the HD which is a large capacity storage unit, it is unnecessary in most cases for the MFP 202 to transmit the copy data to the external storage unit 203 on the network, making it possible to reduce, to a minimum, unnecessary load on the network for data saving.

In this embodiment, a case has been described in which the MFP 202 is used as another image forming apparatus for storing print data to be printed, however, this is not limitative.

The other image forming apparatus may be any apparatus which has an HD for storing print data to be printed and in which the print data can be altered and copy data of the print data can be stored.

Second Embodiment

In the following, a second embodiment of this invention is described with reference to FIGS. 8 to 13.

This embodiment differs from the first embodiment in that copy data of the print data is stored into the external storage unit 203 or the HD 202a of the MFP 202 according to whether or not the print data is altered, if free space of the memory 201a of the MFP 201 is less than the capacity required for execution of an interruption job. In other respect, this embodiment is the same in construction as the first embodiment, and therefore a description of the common structure is omitted.

With reference to FIGS. 8A to 8E, the outline of pull print in this embodiment is first described. FIGS. 8A to 8E schematically show in the second embodiment how requests and print data are exchanged between the MFPs 201, 202 and the external storage unit 203 and how print data and its copy data are stored in the MFPs 201, 202.

As shown in FIG. 8A, print data 601 is stored in the HD 202a of the MFP 202. To print (pull print) the print data 601 in the HD 202a of the MFP 202, the MFP 201 transmits to the MFP 202 via the LAN 204 a request for transmission of the print data to be pull printed. The transmission request is to request the transmission of the print data 601 to be pull printed, but does not request the MFP 202 to copy the print data 601 and store the resultant copy data, unlike the first embodiment. When receiving the transmission request, the MFP 202 transmits the print data 601 to the MFP 201 via the LAN 204.

The MFP 201 receives the print data 601 transmitted from the MFP 202 and stores the print data 601, as print data 602, into the memory 201a. Then, the MFP 201 starts a print job for the print data 602 (a print job for the print data 601).

During execution of the print job for the print data 602, if, for example, an interruption job 603 having higher priority than the print job is generated, the MFP 201 suspends the printing of the print data 602 and confirms free space in the memory 201a.

If the free space in the memory 201a is less than the capacity required for execution of the interruption job, the MFP 201 determines whether or not the print data 601 stored in the HD 202a of the MFP 202 has been altered. For this determination, a hash value of the print data 601, for example, is compared with a hash value of the print data 602. If these two hash values do not coincide with each other, it is determined that the print data 601 has been altered. If, on the other hand, both the hash values coincide with each other, it is determined that the print data 601 has not been altered.

The comparison between the hash values is performed by either the MFP 201 or the MFP 202. In a case that the comparison is performed by the MFP 201, the MFP 201 acquires the hash value of the print data 601 from the MFP 202 and compares it with the hash value of the print data 602. On the other hand, in a case that the comparison is performed by the MFP 202, the MFP 201 transmits the hash value of the print data 602 to the MFP 202. The MFP 202 compares the hash value of the print data 602 with that of the print data 601, and transmits a result of the comparison to the MFP 201.

Instead of making the comparison between the hash values, a data body of the print data 601 may be compared with that of the print data 602, and whether or not the data bodies coincide with each other may be determined to determine whether or not the print data 601 has been altered. The comparison may be made by the MFP 201 or the MFP 202.

If the print data 601 has been altered, the MFP 201 copies the print data 602 stored in the memory 201a and transmits to the external storage unit 203 the copy data of the print data 602 together with a request for storage of the copy data (print data 604), as shown in FIG. 8B. Thus, the print data 604 is stored in the external storage unit 203.

To ensure the capacity in the memory 201a required for execution of the interruption job, the MFP 201 erases the print data 602 in the memory 201a. Then, the MFP 201 carries out the interruption job using the memory 201a (such as, for example, storing the data 603 for the interruption job into the memory 201a).

Upon completion of the interruption job, the MFP 201 erases the data 603 for the interruption job in the memory 201a, as shown in FIG. 8C. Then, the MFP 201 acquires the print data 604 (copy data of print data 602) from the external storage unit 203 via the LAN 204 and restarts the print job for the print data 604.

On the other hand, if the print data 601 stored in the HD 202a of the MFP 202 has not been altered, the MFP 201 transmits a request for copying the print data 601 to the MFP 202, as shown in FIG. 8D. When receiving the copying request, the MFP 202 copies the print data 601 and stores the resultant copy data (print data 605) into the HD 202a or the external storage unit 203. To ensure the capacity in the memory 201a required for execution of the interruption job, the MFP 201 erases the print data 602 in the memory 201a.

Next, the MFP 201 carries out the interruption job by using the memory 201a (such as storing the data 603 for the interruption job into the memory 201a). Upon completion of the interruption job, the data 603 for the interruption job in the memory 201a is erased.

Next, the MFP 201 transmits to the MFP 202 a request for transmission of the copy data of the print data 601, as shown in FIG. 8E. When receiving the transmission request, the MFP 202 transmits to the MFP 201 the print data 605 (copy data of print data 601) stored in the HD 202a or the external storage unit 203. The MFP 201 receives the print data 605 as print data 602 and restarts the print job for the print data 602 (print data 601).

In a case that the free space in the memory 201a is equal to or larger than the capacity required for execution of the interruption job, the MFP 201 carries out the interruption job using the memory 201a, without erasing the print data 602 in the memory 201a. In that case, data 603 for the interruption job is stored in the memory 201a together with the print data 602. Upon completion of the interruption job, the MFP 201 restarts the print job for the print data 602 (print data 601) stored in the memory 201a.

Figure 9:
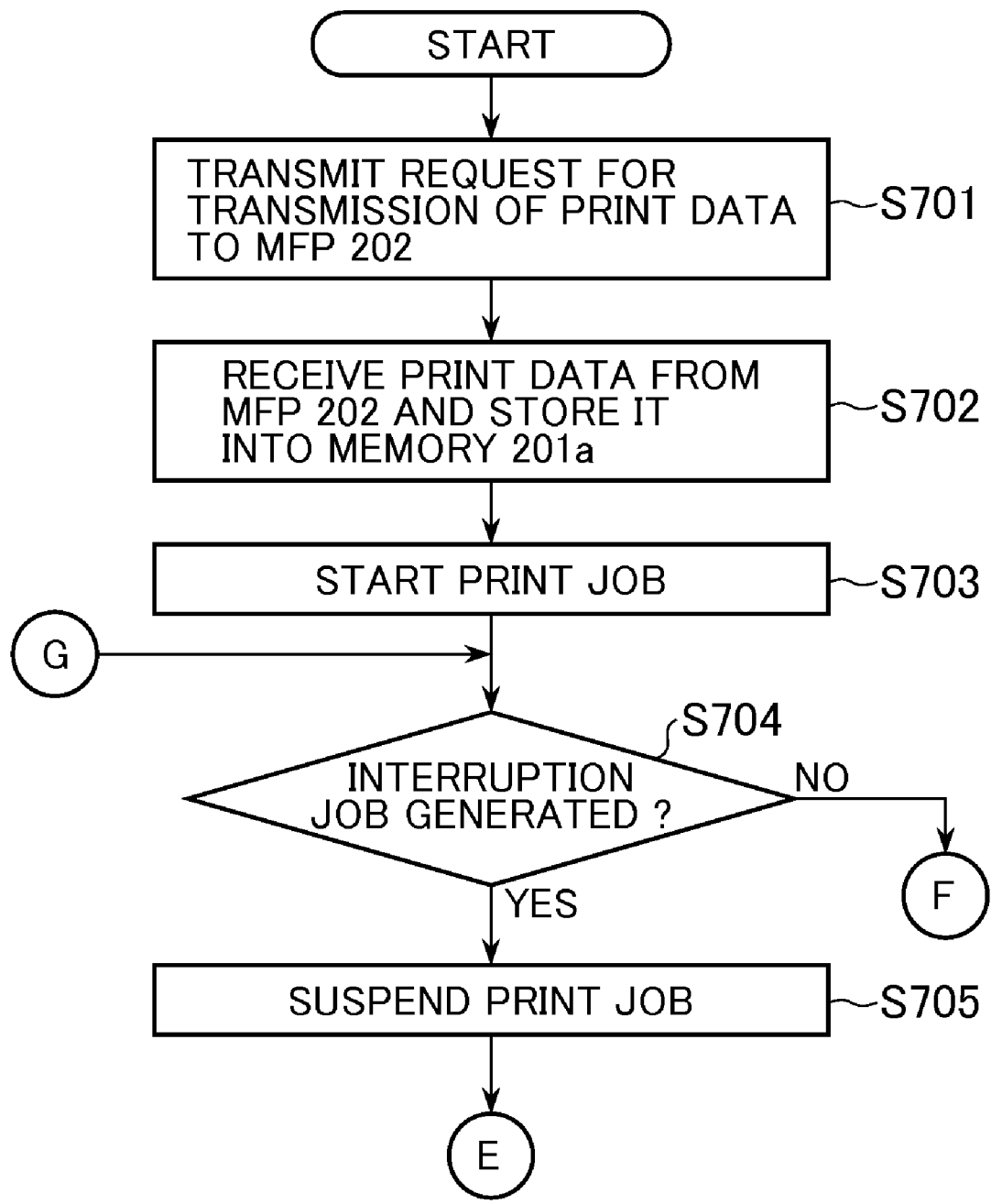
FIG. 9 is a part of a flowchart showing the procedures of a process for pull print performed by one of the MFPs.
Figure 10:
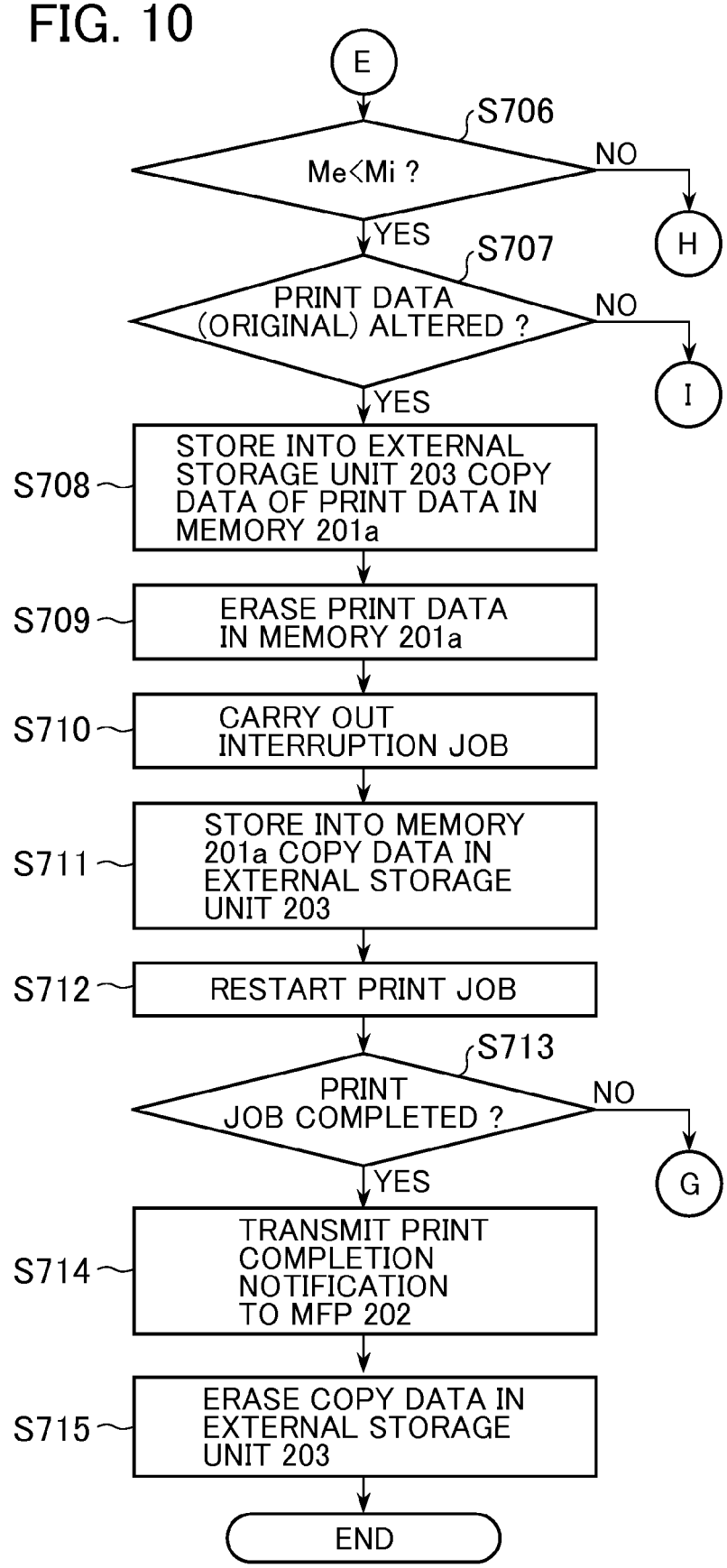
FIG. 10 is another part of the flowchart following the part in FIG. 9.
Figure 11:
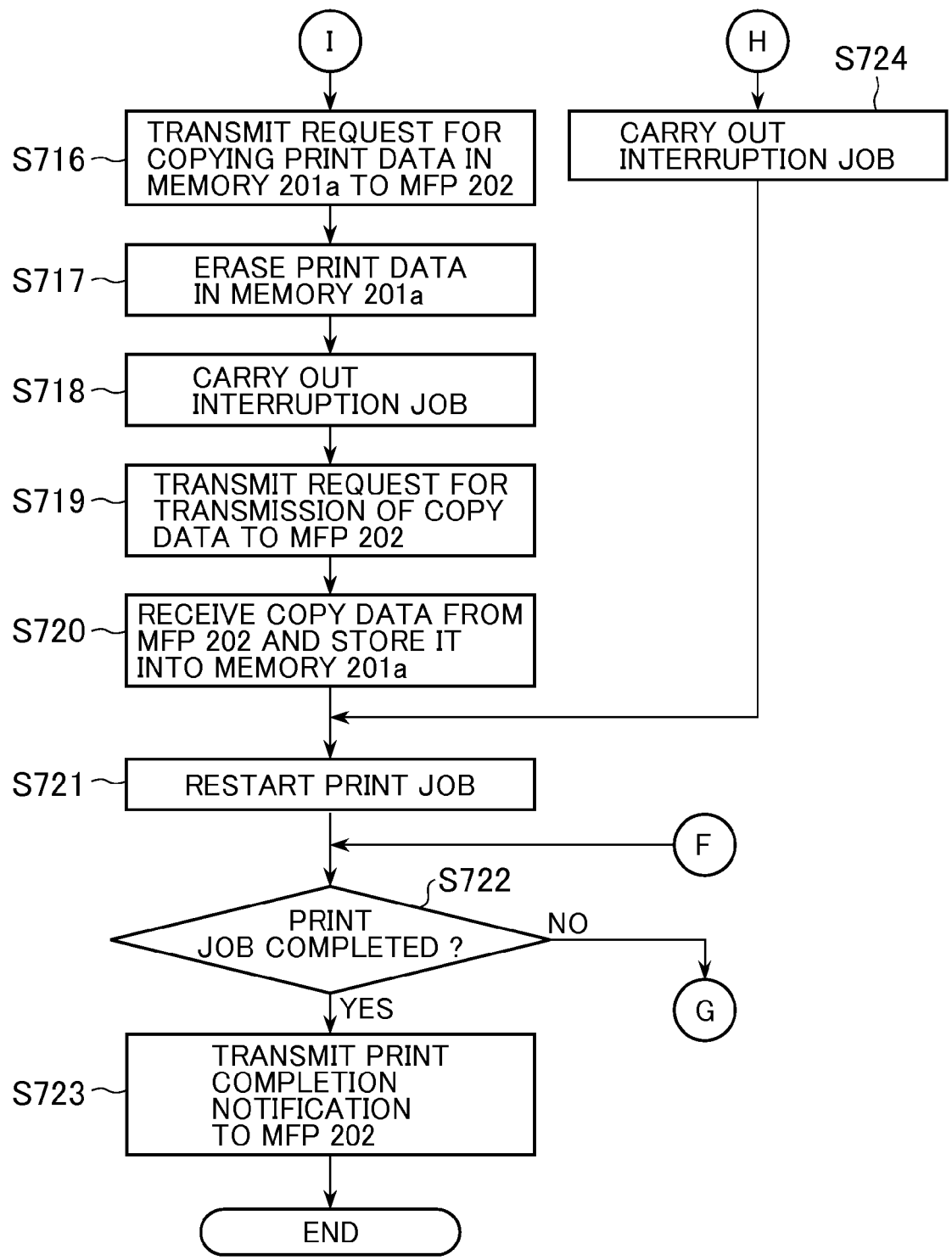
FIG. 11 is the remaining part of the flowchart following the part in FIG. 10.

Next, with reference to FIGS. 9 to 11, a process for pull print performed by the FP 201 is described below. FIGS. 9 to 11 show in flowchart the procedures of the process performed by the MFP 201 to carry out pull print. The procedures shown in FIGS. 9 to 11 are carried out by the CPU 101 (control unit 100) of the MFP 201 in accordance with a program stored in the ROM 102. The following is a description of a case where the MFP 201 draws print data 601 stored in the HD 202a of the MFP 202 and prints (pull prints) the print data 601.

Upon start of pull print, the MFP 201 (CPU 101) transmits a request for transmission of print data 601 to be pull printed, via the LAN 204, to the MFP 202 in which the print data 601 is stored (step S701). Then the MFP 201 receives the print data 601 transmitted from the MFP 202 in response to the transmission request, and stores the print data 601 as print data 602 into the memory 201a (step S702).

Next, the MFP 201 starts a print job for the print data 602 (print job for print data 601) (step S703). Then, the MFP 201 determines whether or not an interruption job having priority higher than the print job is generated during execution of the print job for the print data 602 (step S704). If the interruption job is generated, the MFP 201 suspends the print job for the print data 602 (step S705).

Next, the MFP 201 determines whether or not free space Me in the memory 201a is less than the capacity Mi required for execution of the interruption job (whether or not a relation of Me<Mi is fulfilled) (step S706). If the relation of Me<Mi is fulfilled, the MFP 201 determines whether or not the print data 601 (original) stored in the MFP 202 has been altered (step S707).

If it is determined in step S707 that the print data 601 has been altered, the MFP 201 copies the print data 602 in the memory 201a and stores the resultant copy data (print data 604) into the external storage unit 203 (step S708). To ensure the capacity required to store the interruption job in the memory 201a, the MFP 201 erases the print data 602 in the memory 201a (step S709).

Next, the MFP 201 carries out the interruption job by using the memory 201a such as storing the data for the interruption job into the memory 201a (step S710). Upon completion of the interruption job, the MFP 201 erases the data for the interruption job in the memory 201a.

In response to the interruption job being completed, the MFP 201 acquires the print data 604 (copy data of print data 602) from the external storage unit 203 via the LAN 204, and stores the print data 604 into the memory 201a (step S711). Then, the MFP 201 restarts the print job for the print data 604 stored in the memory 201a, i.e., the print job for the print data 602 (step S712).

Next, the MFP 201 determines whether or not the print job for the print data 602 is completed (step S713). If the printing of the print data 602 is not completed, the MFP 201 returns to step S704, and determines whether or not an interruption job is generated during the printing of the print data 602. If the printing of the print data 602 is completed, the MFP 201 transmits, via the LAN 204 to the MFP 202, a print completion notification (fourth request) indicating that the print job for the print data 602 (i.e., the print data 601) is completed (step S714). Then the MFP 201 erases the print data 604 in the external storage unit 203 (step S715) and completes the present process.

If it is determined in step S707 that the print data 601 has not been altered, the MFP 201 transmits to the MFP 202 a request for copying the print data 601 (step S716). To ensure the capacity required for execution of the interruption job in the memory 201a, the MFP 201 erases the print data 602 in the memory 201a (step S717).

Next, the MFP 201 carries out the interruption job by using the memory 201a, such as storing the data for the interruption job into the memory 201a (step S718). Upon completion of the interruption job, the data for the interruption job in the memory 201a is erased.

In response to the completion of the interruption job, the MFP 201 transmits, via the LAN 204 to the MFP 202, a request for transmission of copy data of the print data 601 (step S719). The MFP 201 receives the copy data of the print data 601 (print data 605) transmitted from the MFP 202 in response to the transmission request, and stores the copy data as print data 602 into the memory 201a (step S720).

Then the MFP 201 restarts the print job for the print data 602 (step S721) and determines whether or not the print job for the print data 602 is completed (step S722). If the print job for the print data 602 is not completed, the MFP 201 returns to step S704 and determines whether or not an interruption job is generated. If the print job for the print data 602 is completed, the MFP 201 transmits via the LAN 204 to the MFP 202 a print completion notification indicating completion of the print job for the print data 602 (i.e., print data 601) (step S723), and completes the present process.

If it is determined in step S706 that a relation of Me<Mi is not fulfilled, the MFP 201 carries out the interruption job using the memory 201a such as storing the data for the interruption job into the memory 201a (step S724). Upon completion of the interruption job, the interruption job data in the memory 201a is erased.

Next, the MFP 201 restarts the print job for the print data 602 (step S721), and determines whether or not the printing of the print data 602 is completed (step S722). If the printing of the print data 602 is not completed, the MFP 201 returns to step S704. On the other hand, if the printing of the print data 602 is completed, the MFP 201 transmits a print completion notification to the MFP 202 via the LAN 204 (step S723), and completes the present process.

If it is determined in step S704 that an interruption job is not generated, the MFP 201 proceeds to step S722 and determines whether or not the print job for the print data 602 is completed.

Figure 12:
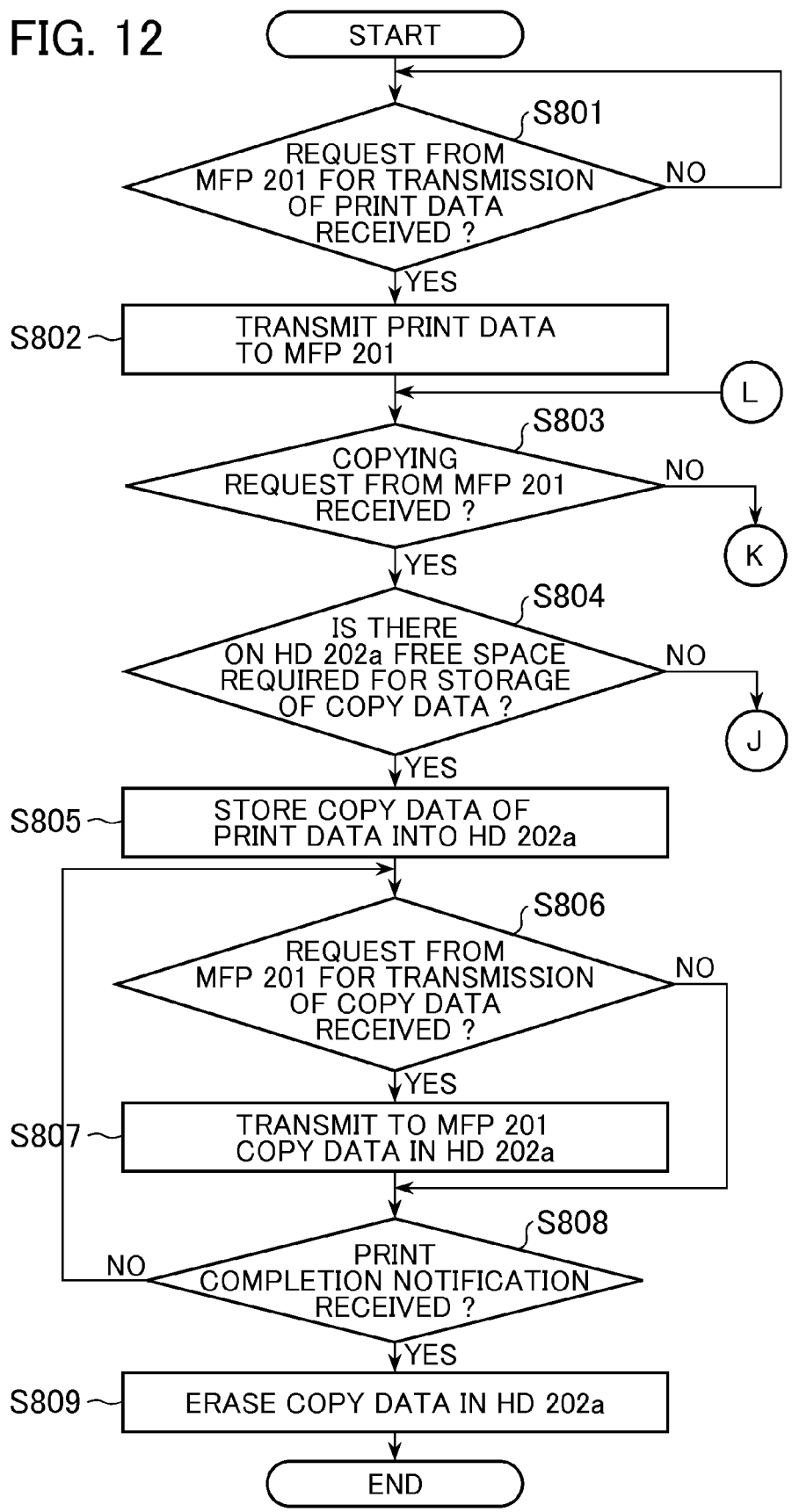
FIG. 12 is a part of a flowchart showing the procedures of a process performed by another MFP when it receives a request for transmission of print data to be pull printed.
Figure 13:
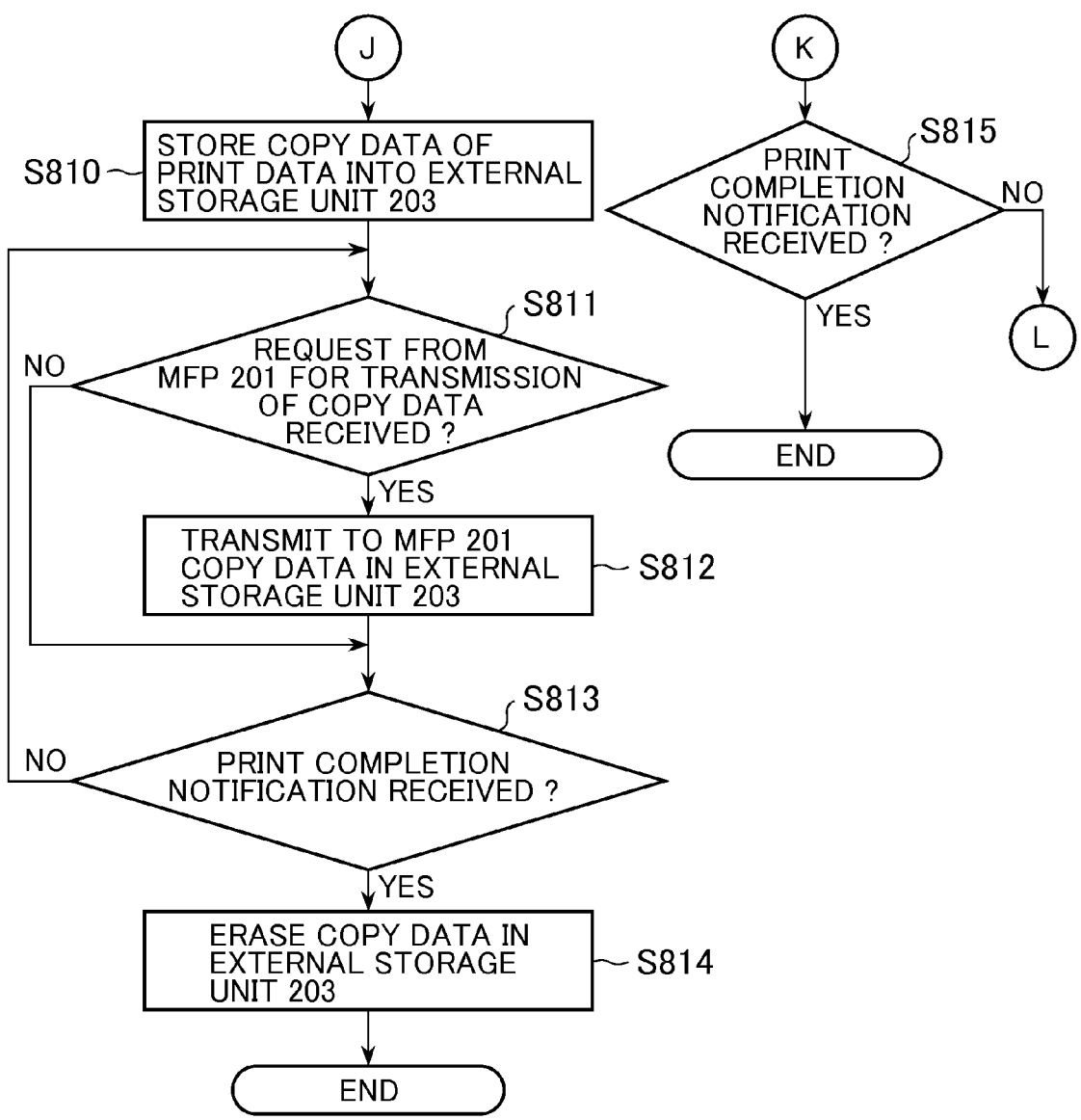
FIG. 13 is the remaining part of the flowchart following the part in FIG. 12.

In the following, with reference to FIGS. 12 and 13, a description is given of the process performed by the MFP 202 when it receives from the MFP 201 a request for transmission of print data to be pull printed. FIGS. 12 and 13 show in flowchart the procedures of the process performed by the MFP 202 in response to a request for transmission of print data to be pull printed. The procedures shown in the flowchart of FIGS. 12 and 13 are executed by the CPU 101 (control unit 100) of the MFP 202 in accordance with a program stored in the ROM 102. The following is a description of a case where the MFP 202 receives a request for transmission of print data 601 from the MFP 201.

The MFP 202 (CPU 101) monitors whether or not it receives a request for transmission of print data 601 from the MFP 201 via the LAN (step S801). When receiving the transmission request, the MFP 202 transmits the print data 601 to the MFP 201 via the LAN 204 (step S802).

Next, the MFP 202 determines whether or not it receives a request for copying the print data 601 from the MFP 201 via the LAN 204 (step S803). When receiving the copying request, the MFP 202 determines whether or not there is a free space on the HD 202a required to store copy data of the print data 601 (step S804). If there is on the HD 202a a free space required for storage of the copy data of the print data 601, the MFP 202 copies the print data 601 and stores the copy data (print data 605) into the HD 202a (step S805).

Next, the MFP 202 determines whether or not it receives a request for transmission of copy data of the print data 601 from the MFP 201 via the LAN 204 (step S806). When receiving the transmission request, the MFP 202 transmits, via the LAN 204, copy data of the print data 601 (print data 605) stored in the HD 202a to the MFP 201 (step S807).

Next, the MFP 202 determines whether or not it receives a print completion notification from the MFP 201 via the LAN 204 (step S808). When receiving the print completion notification, the MFP 202 erases the copy data of the print data 601 (print data 605) stored in the HD 202a (step S809), and completes the present process. On the other hand, when not receiving the print completion notification, the MFP 202 returns to step S806.

If it is determined in step S806 that a request for transmission of the copy data of the print data 601 is not received, the MFP 202 skips step S807 and proceeds to step S808.

If it is determined in step S804 that there is no free space on the HD 202a large enough to store the copy data of the print data 301, the MFP 202 proceeds to step S810 in which the MFP 202 copies the print data 601 and stores the resultant copy data (print data 605) into the external storage unit 203.

Next, the MFP 202 determines whether or not it receives a request for transmission of the copy data of the print data 601 from the MFP 201 via the LAN 204 (step S811). When receiving a request for transmission of the copy data of the print data 601, the MFP 202 transmits, via the LAN 204 to the MFP 201, the copy data of the print data 601 (print data 605) stored in the external storage unit 203 (step S812).

Next, the MFP 202 determines whether or not it receives a print completion notification on the print data 301 from the MFP 201 via the LAN 204 (step S813). When receiving the print completion notification, the MFP 202 erases the copy data of the print data 601 (print data 605) stored in the external storage unit 203 (step S814), and completes the present process. On the other hand, when not receiving the print completion notification, the MFP 202 returns to step S811.

If it is determined in step S811 that a request for transmission of the copy data of the print data 601 is not received, the MFP 202 skips step S812 and proceeds to step S813.

If it is determined in step S803 that a request for copy is not received, the MFP 202 determines whether or not it receives a print completion notification on the print data 301 from the MFP 201 via the LAN 204 (step S815). When receiving the print completion notification, the MFP 202 completes the present process. On the other hand, when not receiving the print completion notification, the MFP 202 returns to step S803.

As described above, in the MFP 201, copy data of print data is stored into the external storage unit 203 when the free space in the memory 201a is less than the capacity required for execution of the interruption job and when print data in the MFP 202 has been altered. As a result, it is possible to prevent the storage capacity of the HD 202a of the MFP 202 is greatly affected by the copy data.

Upon restart of a print job, the copy data of print data before having been altered is acquired, and therefore alteration of print data in the MFP 201 is permitted.

According to this embodiment, since the copy data of the print data is created only when it is required, wasteful creation of the print data can be prevented more appropriately as compared to the first embodiment. Thus, the copy data is created only when an interruption job is generated, whereby the efficiency is further improved.

Other Embodiments

It is to be understood that the present invention may also be accomplished by supplying a system or an apparatus with a storage medium in which a program code of software, which realizes the functions of the above described embodiments is stored and by causing a computer (or CPU or MPU) of the system or apparatus to read out and execute the program code stored in the storage medium.

In that case, the program code itself read from the storage medium realizes the functions of the above described embodiments, and therefore the program code and the storage medium in which the program code is stored constitute the present invention.

Examples of the storage medium for supplying the program code include a floppy (registered trademark) disk, a hard disk, and a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. The program code may be downloaded via a network.

Further, it is to be understood that the functions of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-101401, filed Apr. 9, 2008, which is hereby incorporated by reference herein in its entirety.

What is claimed is:

1. An image forming apparatus having an image processing unit that performs image processing based on image data acquired from another image forming apparatus, comprising:
   a first request unit adapted to request that the other image forming apparatus transmits image data stored in the other image forming apparatus and holds copy data copied from the image data;
   a reception unit adapted to receive the image data transmitted from the other image forming apparatus;
   a storage unit adapted to store the image data received by said reception unit;
   a determination unit adapted to determine whether or not a job having priority higher than the image processing is generated during execution of the image processing by the image processing unit based on the image data stored in said storage unit;
   an erase unit adapted to erase the image data stored in said storage unit in a case that it is determined by said determination unit that the job is generated; and
   a second request unit adapted to request the other image forming apparatus to transmit the copy data after the job is processed,
   wherein the image processing unit restarts the image processing based on the copy data transmitted from the other image forming apparatus in response to the request by said second request unit.

2. The image forming apparatus according to claim 1, further including:
   a transmission unit adapted to transmit to the other image forming apparatus a request for deletion of the copy data from a storage device in response to completion of the image processing performed by the image processing unit based on the image data or the copy data.

3. The image forming apparatus according to claim 2, wherein the storage device is provided in the other image forming apparatus or other apparatus on a network, and has a larger capacity than a storage device provided in the image forming apparatus.

4. An image forming apparatus comprising:
   a first storage unit adapted to store image data into a storage device;
   a reception unit adapted to receive from another image forming apparatus a request for transmission of the image data stored in the storage device by said first storage unit;

a transmission unit adapted to transmit the image data stored in the storage device by said first storage unit to the other image forming apparatus in response to the request received by said reception unit;

a second storage unit adapted, in response to the request received by said reception unit, to generate copy data copied from the image data stored in the storage device by said first storage unit and store the copy data into the storage device or another storage device;

a second transmission unit adapted to transmit the copy data stored in the storage device or the other storage device by said second storage unit to the other image forming apparatus in response to a request from the other image forming apparatus; and an erase unit adapted to erase the copy data stored in the storage device or the other storage device by said second storage unit in response to an instruction from the other image forming apparatus.

5. The image forming apparatus according to claim 4, further including:

a judgment unit adapted to determine whether or not the storage device has free space required for storage of the copy data, wherein said second storage unit stores the copy data in the storage device in a case that it is determined by said judgment unit that the storage device has the required free space, and stores the copy date in the other storage device in a case that it is determined that the storage device does not have the required free space.

6. An image forming apparatus having an image processing unit that performs image processing based on image data acquired from another image forming apparatus, comprising:

a request unit adapted to request the other image forming apparatus to transmit image data stored in the other image forming apparatus;

a reception unit adapted to receive the image data transmitted from the other image forming apparatus;

a first storage unit adapted to store the image data received by said reception unit into a storage device;

a determination unit adapted to determine whether or not a job having priority higher than the image processing is generated during execution of the image processing by the image processing unit based on the image data stored in the storage device by said first storage unit;

a second storage unit adapted to store the image data stored in the storage device by said first storage unit into another storage device in a case that it is determined by said determination unit that the job is generated and the image data stored in the other image forming apparatus is altered;

an erase unit adapted to erase the image data stored in the storage device by said first storage unit; and an acquisition unit adapted to acquire the image data stored in the other storage device by said second storage unit from the other storage device after the job is processed, wherein the image processing unit restarts the image processing based on the image data acquired by said acquisition unit.

7. The image forming apparatus according to claim 6, including:

a second request unit adapted to request the other image forming apparatus to hold the copy data copied from the image data stored in the other image forming apparatus in a case that it is determined by said determination unit that the job is generated and the image data stored in the other image forming apparatus is not altered; and a third request unit adapted to request the other image forming apparatus to transmit the copy data after the job is processed, wherein the image processing unit restarts the image processing based on the copy data transmitted from the other image forming apparatus in response to the request from said third request unit.

8. The image forming apparatus according to claim 7, further including:

a transmission unit adapted to transmit to the other image forming apparatus a request for deletion of the copy data from a storage device in response to completion of the image processing performed by the image processing unit based on the image data or the copy data.

9. The image forming apparatus according to claim 6, further including:

a judgment unit adapted to determine whether or not the image data stored in the other image forming apparatus is altered.

10. The image forming apparatus according to claim 9, wherein said judgment unit compares a hash value of the image data stored in said first storage unit with a hash value of the image data stored in the other image forming apparatus to thereby determine whether or not the image data is altered.

11. A control method for an image forming apparatus including an image processing unit that performs image processing based on image data acquired from another image forming apparatus, comprising:

a first request step of requesting that the other image forming apparatus transmits image data stored in the other image forming apparatus and holds copy data copied from the image data;

a reception step of receiving the image data transmitted from the other image forming apparatus;

a storage step of storing into a storage unit the image data received in said reception step;

a determination step of determining whether or not a job having priority higher than the image processing is generated during execution of the image processing by the image processing unit based on the image data stored in the storage unit in said storage step;

an erase step of erasing the image data stored in the storage unit in a case that it is determined in said determination step that the job is generated;

a second request step of requesting the other image forming apparatus to transmit the copy data after the job is processed; and a restart step of restarting the image processing by the image processing unit based on the copy data transmitted from the other image forming apparatus in response to the request in said second request step.

12. A control method for an image forming apparatus, comprising:

a first storage step of storing image data into a storage device;

a reception step of receiving from another image forming apparatus a request for transmission of the image data stored in the storage device in said first storage step;

a transmission step of transmitting the image data stored in the storage device in said first storage step to the other image forming apparatus in response to the request received in said reception step;

a second storage step of generating copy data copied from the image data stored in the storage device in said first storage step and storing the copy data into the storage device or another storage device in response to the request received in said reception step;

a second transmission step of transmitting copy data stored in the storage device or the other storage device in said second storage step to the other image forming apparatus in response to a request from the other image forming apparatus; and an erase step of erasing the copy data stored in the storage device or the other storage device in said second storage step in response to an instruction from the other image forming apparatus.

13. A control method for an image forming apparatus having an image processing unit that performs image processing based on image data acquired from another image forming apparatus, comprising:

a request step of requesting the other image forming apparatus to transmit image data stored in the other image forming apparatus;

a reception step of receiving the image data transmitted from the other image forming apparatus;

a first storage step of storing the image data received in said reception step into a storage device;

a determination step of determining whether or not a job having priority higher than the image processing is generated during execution of the image processing by the image processing unit based on the image data stored in the storage device in said first storage step;

a second storage step of storing the image data stored in the storage device in said first storage step into another storage device in a case that it is determined in said determination step that the job is generated and the image data stored in the other image forming apparatus is altered;

an erase step of erasing the image data stored in the storage device in said first storage step;

an acquisition step of acquiring the image data stored in the other storage device in said second storage step from the other storage device after the job is processed; and a restart step of restarting the image processing by the image processing unit based on the image data acquired in said acquisition step.

* * * * *